United States Patent
Gangireddy et al.

(10) Patent No.: US 12,488,202 B2
(45) Date of Patent: Dec. 2, 2025

(54) SYSTEMS AND METHODS OF CONVERSATION ANALYSIS

(71) Applicant: ADP, Inc., Roseland, NJ (US)

(72) Inventors: Uday Kumar Reddy Gangireddy, Cumming, GA (US); Henry C. Will, IV, Dover, NJ (US)

(73) Assignee: ADP, Inc., Roseland, NJ (US)

( * ) Notice: Subject to any disclaimer, the term of this patent is extended or adjusted under 35 U.S.C. 154(b) by 511 days.

(21) Appl. No.: 17/554,120

(22) Filed: Dec. 17, 2021

(65) Prior Publication Data
US 2023/0196032 A1    Jun. 22, 2023

(51) Int. Cl.
*G06F 17/00*        (2019.01)
*G06F 16/3329*      (2025.01)
(Continued)

(52) U.S. Cl.
CPC .......... *G06F 40/42* (2020.01); *G06F 16/3329* (2019.01); *G06F 40/35* (2020.01); *G06F 40/30* (2020.01)

(58) Field of Classification Search
CPC ........ G06F 40/42; G06F 40/10; G06F 40/103; G06F 40/137; G06F 40/14; G06F 40/279; G06F 18/24; G06F 18/25; G06F 18/20; G06F 18/26; G06F 40/35; G06F 40/30; G06F 16/3329; G06F 16/90332; G06F 16/9024; G06F 16/219; G06F 40/20; G06F 16/33; G06F 16/338; G06F 16/34; G06F 3/0482; G06F 16/00; G06F 16/3344; G06F 3/0481; G06F 2203/04803; G06F 40/284; G06F 16/9038; G06F 16/907; G06F 3/04886; G06F 16/3328; G06F 16/903; G06F 16/248; G06F 16/26; G06F 3/14; (Continued)

(56) References Cited

U.S. PATENT DOCUMENTS 10,698,585 B2 * 6/2020 Kraljic ................ G06F 3/04842
2019/0182382 A1 * 6/2019 Mazza .................. H04M 3/527
(Continued)

FOREIGN PATENT DOCUMENTS

CA         3018060 A1 *  3/2020  ........... G06F 3/0481

OTHER PUBLICATIONS

Avi Yaeli et al., "Dialog Flow Analysis for Watson Assistant", IBM Cloud Pak for Data, MIT License, https://dataplatform.cloud.ibm.com/exchange/public/entry/view/013c690997e27f3a8d9133265327a9e5, Modified Jun. 25, 2020, downloaded Dec. 15, 2021.

*Primary Examiner* — Michael Ortiz-Sanchez
(74) *Attorney, Agent, or Firm* — Foley & Lardner LLP

(57) ABSTRACT

The present disclosure relates to a system and method of providing analysis of chatbot conversation paths, and more particularly, to a system and method which provides visual and data observation of conversation paths and related information to provide a more efficient means of analysis. The method includes: receiving, by a computer system, a plurality of conversational transcripts, converting, by the computer system, the plurality of conversational transcripts into a visualization which includes a plurality of branches representing different conversation paths for the plurality of conversational transcripts; and displaying, by the computer system, the visualization with the plurality of branches.

21 Claims, 12 Drawing Sheets

(51) Int. Cl.
  *G06F 40/35*    (2020.01)
  *G06F 40/42*    (2020.01)
  *G06F 40/30*    (2020.01)

(58) Field of Classification Search
  CPC .... G06F 16/9035; G06F 16/345; G06F 16/44;
    G06F 8/34; G06F 16/64; G06F 16/322;
    G06F 40/56; G10L 15/22; G10L 15/063;
    G10L 2015/0631; G10L 15/26; G10L
    15/16; G10L 17/22; G10L 2015/221;
    G10L 2015/0638; G06N 5/01; G06N
    20/00; G06N 5/022; G06N 5/04; G06N
    3/08; G06N 3/02
  See application file for complete search history.

(56)        References Cited

U.S. PATENT DOCUMENTS

| | | | |
|---|---|---|---|
| 2020/0137002 A1* | 4/2020 | Chavda | G06N 20/00 |
| 2020/0265339 A1* | 8/2020 | Eisenzopf | G06N 3/006 |
| 2020/0356237 A1* | 11/2020 | Moran | G06F 3/0481 |
| 2021/0157990 A1* | 5/2021 | Lima | H04L 51/02 |
| 2021/0158203 A1* | 5/2021 | Ganti | G06N 3/08 |
| 2021/0168110 A1* | 6/2021 | Marmar | G06F 40/30 |

\* cited by examiner ated to analyze the performance (e.g., effectiveness, containment, satisfaction, etc.) of those conversations by reviewing the conversations one by one. For example, it is difficult to manually look at transcripts and see whether chatbots provide appropriate answers. A more efficient analysis is obtained by looking at the data from the perspective of what conversations are occurring most often or grouped by certain characteristics (e.g., conversational pathways, whether a conversation has been escalated, time ranges, split path by dialog turn, etc.) and then analyzing them. It is also helpful to look at the conversations as a whole to see what the volume is for various conversations flows that are being followed. Also, with a high volume of data, it is very time consuming to review conversational flows one by one. Therefore, it may be helpful to review groupings of conversational flows and categories of conversational flows.

This type of analysis is addressed by loading conversations into spreadsheets and using spreadsheet filters, grouping, and pivot tables to manually analyze conversation flows. This process is not easy to interpret because the analysis does not provide any visualization to assist in telling the story behind the data.

SUMMARY

In a first aspect of the disclosure, a method includes: receiving, by a computer system, a plurality of conversational transcripts, converting, by the computer system, the plurality of conversational transcripts into a visualization which includes a plurality of branches representing different conversation paths for the plurality of conversational transcripts; and displaying, by the computer system, the visualization with the plurality of branches.

In another aspect of the disclosure, there is a computer program product including one or more computer readable storage media having program instructions collectively stored on the one or more computer readable storage media, the program instructions executable to: receiving a plurality of conversational chatbot transcripts, converting the plurality of conversational chatbot transcripts into a Sankey Diagram which includes several branches that diverge from one another and converge into one another and which are representative of pathways of different portions of conversations within a chatbot; providing metrics data of the several branches, and displaying the Sankey Diagram and the metrics data.

In a further aspect of the disclosure, there is a system, including: a processor, a computer readable memory, one or more computer readable storage media, and program instructions collectively stored on the one or more computer readable storage media, the program instructions executable to: receive a plurality of conversational chatbot transcripts,

SYSTEMS AND METHODS OF CONVERSATION ANALYSIS

TECHNICAL FIELD

The present disclosure relates to a system and method of providing analysis of conversation paths, and more particularly, to a system and method which provides visual and data observation of conversation paths and related information to provide a more efficient means of analysis.

BACKGROUND

When chatbots handle a large volume of conversations, it is often difficult and time consuming to analyze the performance (e.g., effectiveness, containment, satisfaction, etc.) of those conversations by reviewing the conversations one by one. For example, it is difficult to manually look at transcripts and see whether chatbots provide appropriate answers. A more efficient analysis is obtained by looking at the data from the perspective of what conversations are occurring most often or grouped by certain characteristics (e.g., conversational pathways, whether a conversation has been escalated, time ranges, split path by dialog turn, etc.) and then analyzing them. It is also helpful to look at the conversations as a whole to see what the volume is for various conversations flows that are being followed. Also, with a high volume of data, it is very time consuming to review conversational flows one by one. Therefore, it may be helpful to review groupings of conversational flows and categories of conversational flows.

display a first conversational visualization including a Sankey Diagram which shows proportional volume of conversations going through a plurality of nodes for the conversational transcripts, and display a second conversational visualization which includes at least one escalation path and volume corresponding to the at least one escalation path based on a selected one of an escalation path parameter of the first conversational visualization.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION OF ASPECTS OF THE DISCLOSURE

Figure 1:
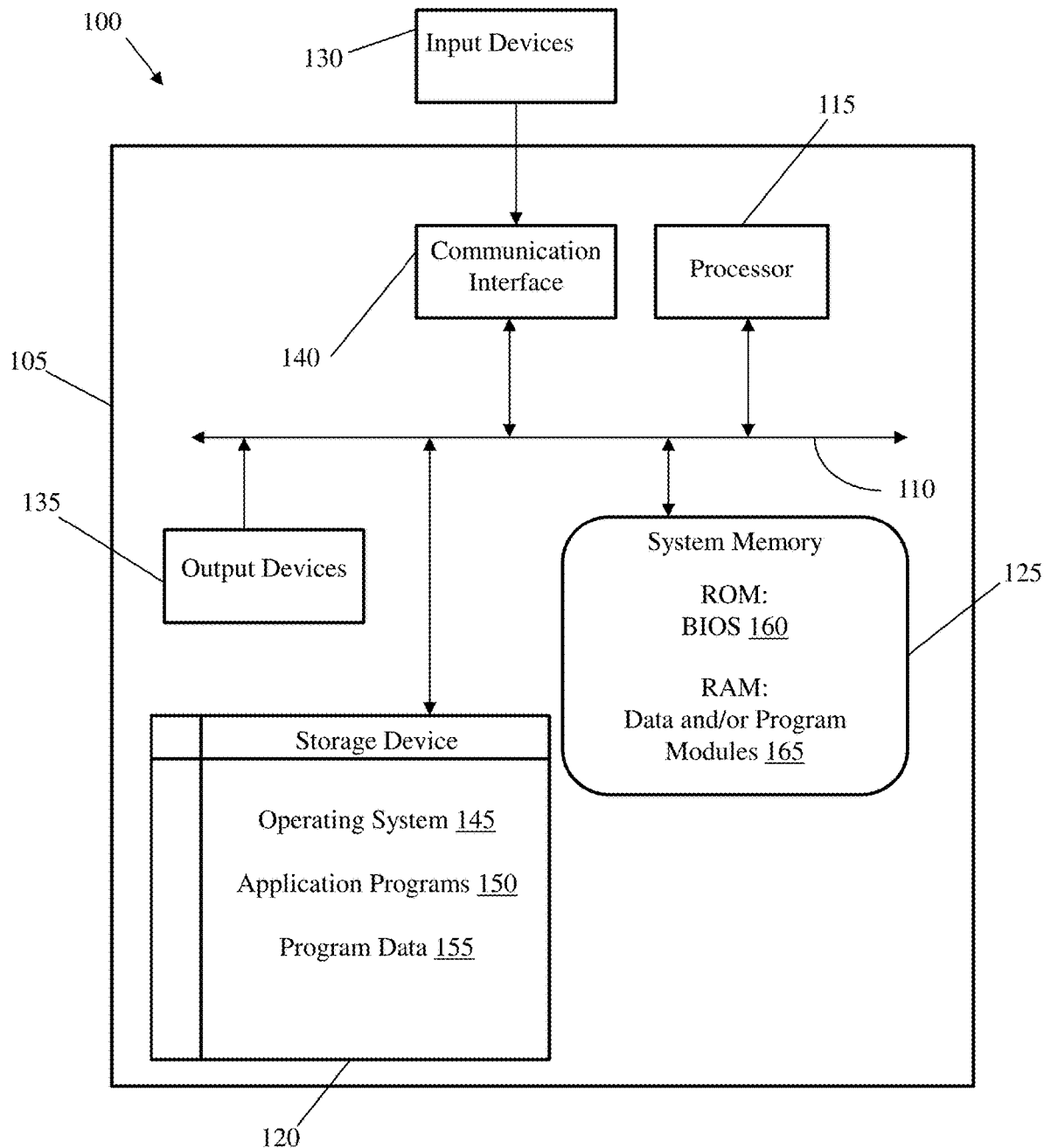
FIG. 1 is an illustrative architecture of a computing system implemented as embodiments of the present disclosure.

The present disclosure relates to a system and method of providing analysis of conversation paths, and more particularly, to a system and method which provides visual and data observation of conversation paths and related information to provide a more efficient means of analysis. In accordance with more specific aspects of the disclosure, a system, method and computer program product are configured to provide an efficient mechanism for analyzing chatbot conversations by using visual representations of chatbot conversations.

In more specific embodiments, a large volume of conversational transcripts can be easily analyzed by leveraging graphical representation tools (e.g., Sankey diagrams) which visually illustrate the flow of any single or groups of conversations. By providing the visual representation, it is now possible to look at data of chatbot conversations from the perspective of what conversations are occurring most often or grouped by predetermined characteristics to perform an analysis of these conversations. Further, it is now possible to look at data of chatbot conversations as a whole to see what volumes are for various conversations flows. For example, it is now possible to visually categorize conversations into different groupings including: (i) what percentage of conversations can be contained within the chatbot which would not require passing to a live representative; 2) which questions are covered by the chatbot; and 3) whether the chatbot is adequately answering questions to see how to improve conversations with the chatbot and to meet customer satisfaction. Thus, the present disclosure can provide visual and data observation of conversation paths and related information to provide a more efficient means of analysis to improve the chatbot.

The systems, processes, and computer program products described herein provide a technical solution to the problem described above by providing visual and data observation of conversation paths and grouping conversations by predetermined characteristics to perform an analysis of these conversations. The technical solution can be accomplished through the use of Sankey Diagrams and analytics tools to illustrate the flow of any single or group of conversations. In particular, by the use of Sankey Diagrams it is possible to allow the user to visualize a large volume of conversations through various nodes of the conversation. The visual and data observation of conversation paths and grouping of conversations may be displayed to a user through a graphical user interface (GUI) in accordance with aspects of the present disclosure.

In embodiments, the system and/or method for providing analysis of chatbot conversation paths can be implemented in a computer program product or computing system as described in more detail herein. The system can provide information and support analysis used to improve the chatbot by providing visual and data observation of conversation paths and related information. Further, although the systems and/or method may provide analysis of chatbot conversation paths, embodiments are not limited. In particular, embodiments of the systems and/or method may also be applied to spoken transcripts, interactive voice response (IVR) transcripts, and digital assistant transcripts.

Computing Infrastructure

FIG. 1 is an illustrative architecture of a computing system 100 implemented as embodiments of the present disclosure. The computing system 100 is only one example of a suitable computing system and is not intended to suggest any limitation as to the scope of use or functionality of the present disclosure. As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions.

For example, processor 105 can gather (e.g., pull) data across a variety of sources, such as large volumes of conversational transcripts associated with chatbot conversations. The processer 105 can collate such data from the perspective of what conversations are occurring most often or group the data from the perspective of what the frequency of categories of conversations are or group by other characteristics and display them in a graphical format for ease of analysis. For example, the visual representation can show different paths and nodes for analysis of the conversations. In more specific embodiments, the visual representations of different paths and nodes will allow the user the ability to easily visualize, discern, select and analyze different types of conversations, including, but not limited to, metrics data, a frequency range of escalation paths (e.g., most prevalent escalation paths), topics in user utterances, intents leading to escalation, etc., and provide these different analytics in different reports.

In embodiments, processor 115 may receive input signals from one or more input devices 130 and/or drive output signals through one or more output devices 135. The received input signals may be the data (received information) used by processor 115 to provide the functionality of the systems and methods described herein. For example, the input data may be different conversations within the chatbot. The output devices 135 can be, for example, any display device, printer, audio speakers, etc.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as the input devices 130, mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to provide visual and data observation of conversation paths based on predetermined characteristics in order to perform analysis of these conversations. The analysis of these conversations can be accomplished through the use of Sankey Diagrams and an analytics tool to illustrate the flow of any single or group of conversations through different paths and nodes of the different paths. In particular, the Sankey Diagram allows the user to visualize different conversations going through different paths and various nodes which are representative of the conversations. Accordingly, computing device 105 may perform the tasks as described herein (e.g., process, steps, methods and/or functionality) in response to processor 115 executing program instructions contained in a computer readable medium, such as system memory 125.

The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

Figure 2:
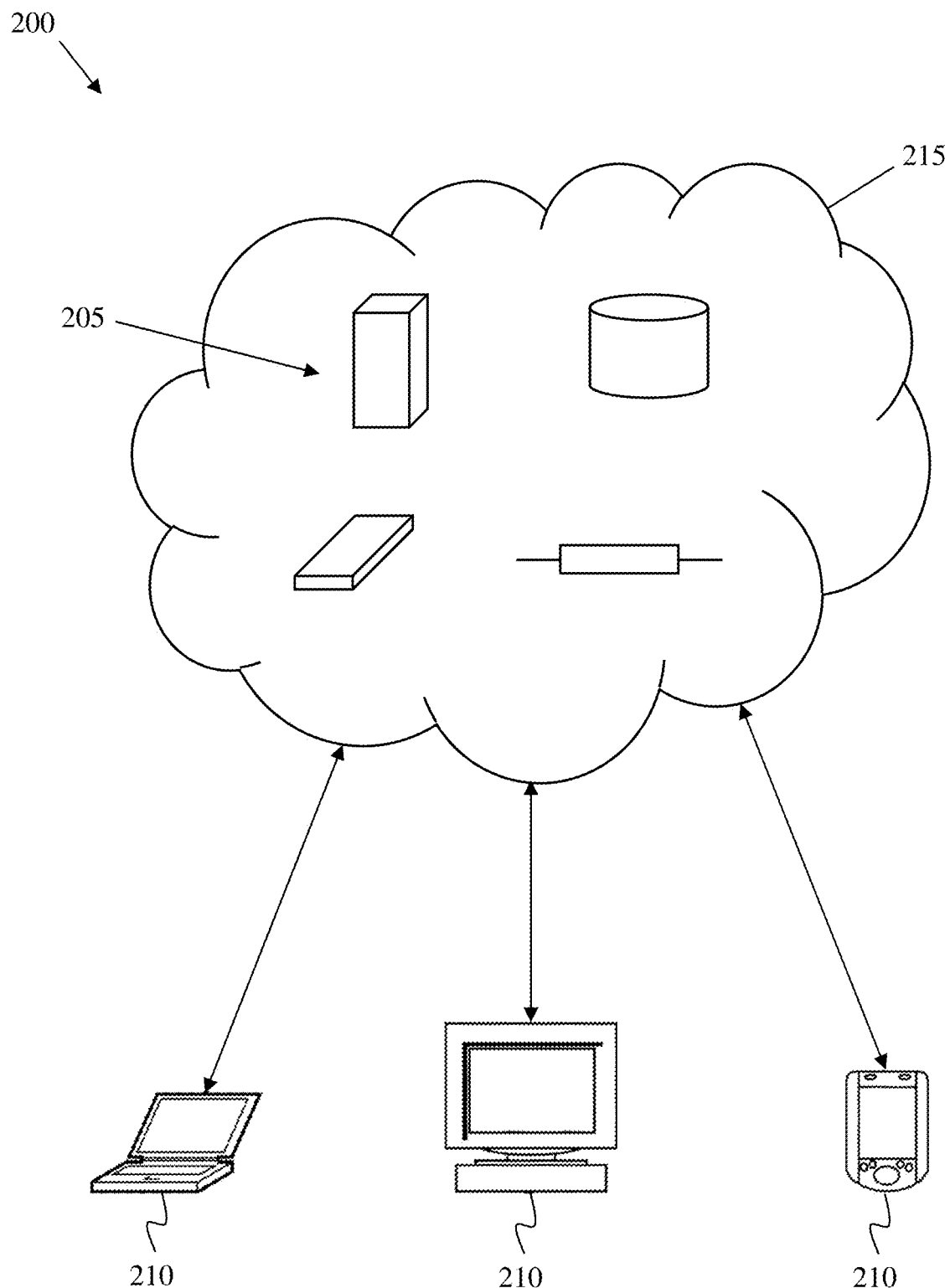
FIG. 2 shows an exemplary cloud computing environment in accordance with aspects of the disclosure.

FIG. 2 shows an exemplary cloud computing environment 200. Cloud computing enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, POS terminals, laptop computers, handheld computers (e.g., smartphones, tablet computers, cellular telephones), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

The modules of the each of the exemplary flows described herein can be illustrative of a system, a method, and/or a computer program product and related functionality implemented on the computing system of FIG. 1. The computer program product may include computer readable program instructions stored on computer readable storage medium (or media). The computer readable storage medium includes the one or more storage medium as described with regard to FIG. 1, e.g., non-transitory media, a tangible device, etc. The method, and/or computer program product implementing the flows herein can be downloaded to respective computing/processing devices, e.g., computing system of FIG. 1 as already described herein, or implemented on a cloud infrastructure as described with regard to FIG. 2.

Figure 3:
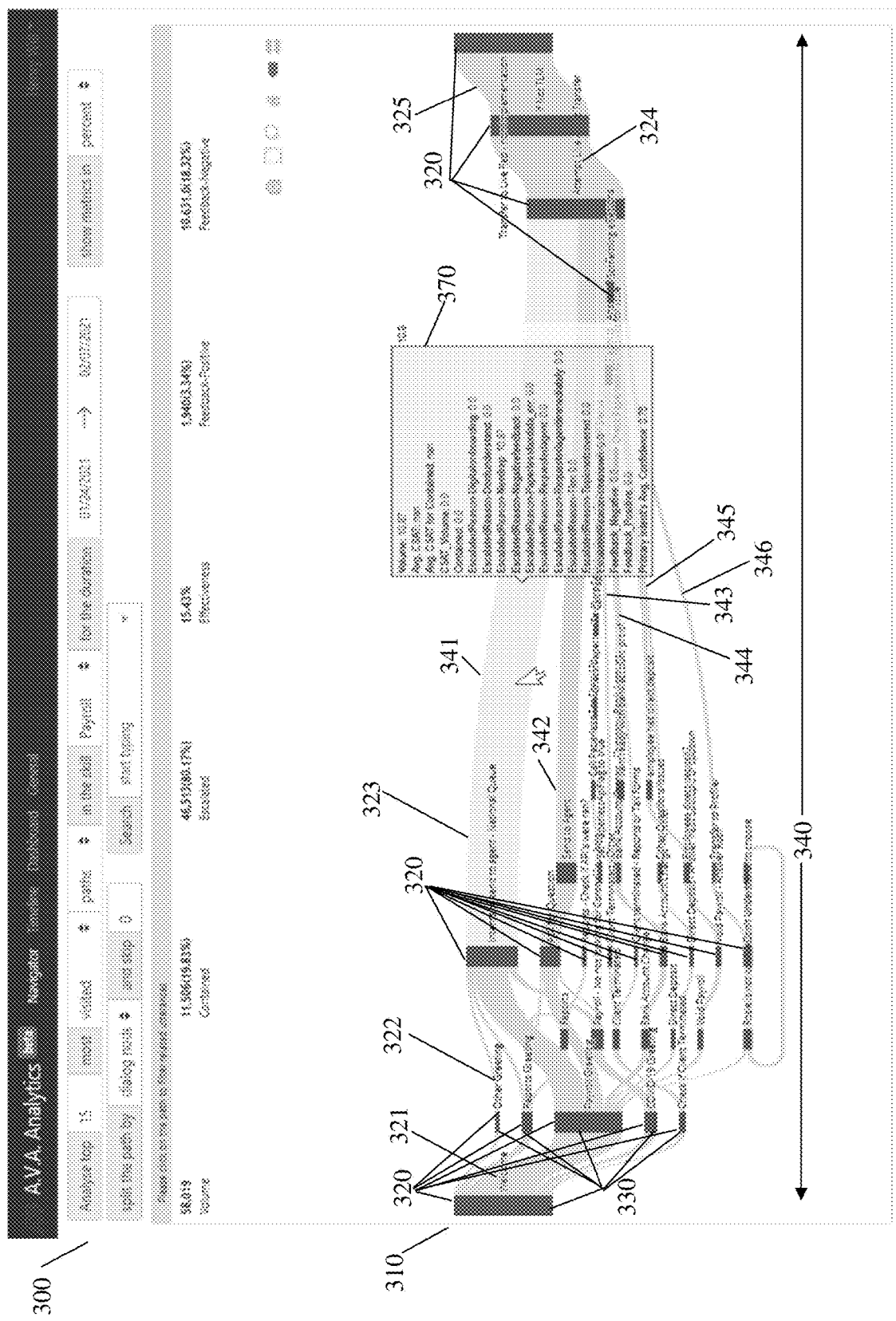
FIG. 3 depicts a conversational visualization using a Sankey Diagram in accordance with aspects of the present disclosure.

Iilustrative Interfaces/Visulaizations Implementing Aspects of the Chatbot Analysis FIG. 3 depicts a visualization 300 of a conversational using a Sankey Diagram 310. In embodiments, the visualization can be representative of a graphical user interface. In the context of the present disclosure, the Sankey Diagram 310 provides versatility for performing chatbot conversational analysis as it allows the user to visualize several different conversations in a single visualization, select different conversational features and change parameters of how to view the different conversations. The Sankey Diagram 310 may also be configured to filter the conversations to provide insights. For example, the Sankey Diagram 310 allows the user to visualize different conversations and/or intents and/or actions taken by the chatbot going through various nodes 320 of the combined conversations 340. More specifically, each of the nodes 320 can be representative of different questions or other conversational paths that diverge from a particular path of the conversations of a chatbot as represented by reference numeral 340. In other words, in the Sankey Diagram 310, the path 340 may be representative of the different nodes 320 and/or paths of a volume of different conversations of different users within the chatbot. Further, each of the nodes 320 can merge or diverge from different paths in the conversations 340, depending on the flow of the conversation of the users of the chatbot. Further, the merging and diverging of the paths can be representative of different conversational pathways and then can lead back to a same conversational path from the different conversional pathways. For example, in FIG. 3, the conversations within the chatbot 340 can be segmented into individual paths 341, 342, 343, 344, 345, 346 which are representative of different chatbot conversations. In embodiments, the nodes 320 can be represented by a solid bar (or other visualization) to show how different actions resulting in, for example, the conversation taking different paths 341, 342, 343, 344, 345, and 346. The nodes 320 can also be placed within the paths and do not need to be at places of diverging or converging of the paths. In a specific embodiment, the visualization 300 may show tagging of the plurality of conversational pathways to identify a performance of a conversation that hits at least one predetermined tag of the plurality of conversational pathways. In another embodiment, the visualization may include a tree map diagram which can be filtered to provide insights for the plurality of conversational transcripts.

In FIG. 3, the nodes and/or paths may have different thicknesses which are representative of a volume as shown in the volume 330 of the different paths (i.e., individual paths 341, 342, 343, 344, 345, and 346). For example, the taller (e.g., thicker) the solid bar of the volume 330 or the width of the path, the more escalation is occurring to or within a certain path. Likewise, the thinner the solid bar of the volume 330, the less traffic/conversation flows are occurring to or within a certain path. In further embodiments, the user can select (e.g., click) on the path, at which stage metrics data 370 can be generated and shown. In another embodiment, color may be used to represent different aspects of the data (e.g., confidence of an intent, category of a user, etc.) The metrics data 370 can provide many different statistics including the overall volume of questions/answers (e.g., conversation within the certain path), in addition to what volume has escalated to different paths within the visualization. For example, in the metrics data 370, 10.87 of the volume has escalated to "EscalatedReason-need rep" (i.e., need representative), and 0.75 is associated with "Primary Intent's Avg. Confidence". The metrics data 370 that are available may be categorized as visited, contained, escalated, effective, ineffective, escalated reasons, by paths or intents, time range, by percent or volume, split path by dialog node, skip nodes, search for certain nodes or paths, effective user feedback, ineffective user feedback, negative user feedback, positive user feedback, average confidence, mean confidence, maximum confidence, minimum confidence, standard deviation from the mean confidence, etc. In an embodiment, searching (i.e., filtering) can be performed in the Sankey Diagram 310 for one of the metrics data 370 and the Sankey Diagram 310 can be re-drawn after the searching (i.e., filtering) is performed for the one of the metrics data 370.

In a more specific example of FIG. 3, each node 320 may be a part of overall combined conversations 340 representative of a particular conversation with the chatbot. In an example of FIG. 3, the node 320 may start with a "welcome" 321 and then move towards "other greeting" 322 in the individual path 341. The node 320 may then move towards "intents to send to agent—national queue" 323 in the individual path 341. Further, node 320 may then move towards "attempt live rep transfer" 324 and finally to "transfer to live rep—normal implementation" 325 in the individual path 341. To represent this as the flow of the conversation in the individual path 341 with the chatbot, the user may be welcomed by the chatbot, receive other greeting from the chatbot, and then the intents of the user are sent to an agent through a queue. After the intents are sent to the agent through the queue, the chatbot attempts to transfer the user to a live representative in the individual path 341. Finally, in node 320, the users in this path were transferred to the live representative on the individual path 341. Further, as shown in FIG. 3, each of the nodes 320 can merge and diverge to other nodes 320 based on a conversation flow in the different individual paths.

In embodiments, it is also possible to select various chatbots, time range (duration), and metrics in percent or volume. Also, as a default, the visualization can show each node in the conversation, or, in further embodiments, provide visualization of the consolidated paths by consolidating nodes 320. In particular, by consolidating nodes 320 of any turn of the conversation, the conversation can be displayed in a simplified and truncated Sankey Diagram 310. The time range (duration) may be a specified time period for a conversation flow with a chatbot.

Moreover, skipping of nodes 320 and/or turns is allowed in the visualization to focus on certain parts of the conversation. In particular, by skipping of nodes 320 and/or turns in the Sankey Diagram 310, the Sankey Diagram 310 may be provided in a simplified and truncated manner. In addition, a user can also search on nodes 320 to focus on a particular analysis. In particular, by searching on a particular node 320 in the Sankey Diagram 310, the user can focus their analysis on a particular portion of the conversation flow and how the chatbot can be improved. The user can also move nodes 320 and/or turns in the Sankey Diagram 310 to make the diagram easier to read and analyze.

Figure 4:
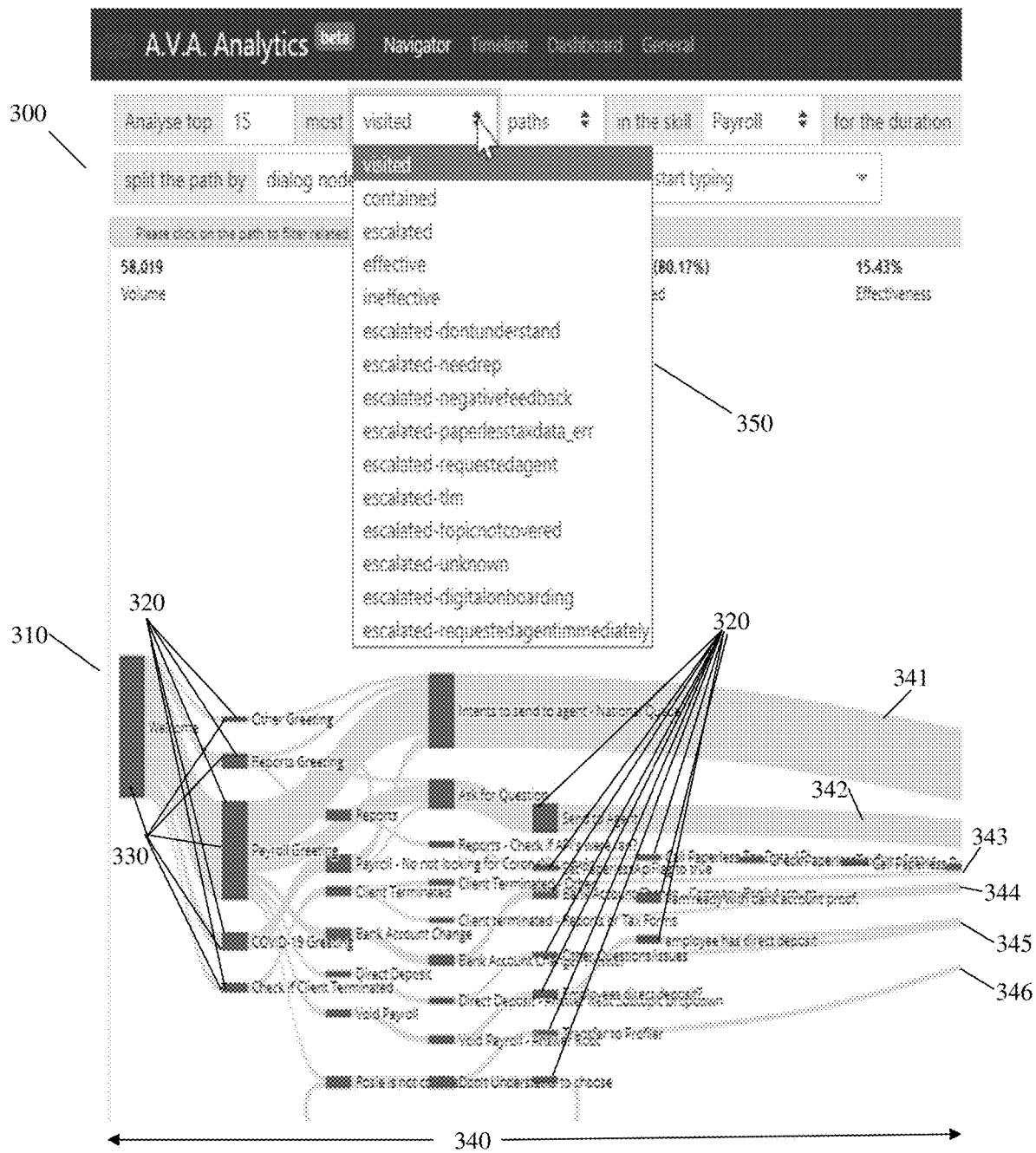
FIG. 4 depicts selecting types of conversation in the conversational visualization in accordance with aspects of the present disclosure.

FIG. 4 depicts a visualization that allows the user to select different types of actions in the conversational visualization through a drop down menu 350. In FIG. 4, the drop-down menu 350 includes a list which provides details of some of the available paths 341-346 representative of different conversations of the chatbot which merge and diverge through nodes 320. For example, the list of the drop-down menu 350 includes, amongst other contemplated paths, visited paths, contained paths, escalated, effective, escalated—don't understand, escalated—requested agent, and escalated—topic not covered. By selecting the different options in the drop-down menu 350, a graphical visualization will be generated and provided associated with the selection. In this way, the user can focus their analysis on very specific nodes, actions, etc.

More specifically, in the list of the drop-down menu 350 of FIG. 4, following paths are contemplated, amongst others:

(i) the "visited" selection visualizes all of the conversation paths visited by users. This is the visualization that is shown in FIG. 3 and FIG. 4;

(ii) the "contained" selection visualizes conversation paths where the whole conversation was "contained" by the chatbot (i.e., the conversation did not have to be escalated to a live agent);

(iii) If the conversation was not "contained" by the chatbot, then one of the paths may have to be escalated to a live agent for various reasons (e.g., chatbot did not understand the conversation of the user, the user requested a live agent, the topic was not covered by the chatbot, etc.). In this case, the "escalated" selection shows the paths that were escalated to a live agent;

(iv) the "effective" selection shows the paths where the users provide feedback that their question was answered;

(v) the "escalated—don't understand" selection represents paths that were escalated to a live agent where the chatbot did not understand the user's intent;

(vi) the "escalated—requested agent" selection represents paths that were escalated to the live agent because the user specifically asked for the live agent;

(vii) the "escalated—topic not covered" selection represents paths that were escalated to a live agent where the chatbot did not have coverage for the user's intent. This situation exists for the escalated—topic not covered where the chatbot intentionally did not have an answer for the user's intent (for example, certain questions where a live agent must be involved);

(viii) the "ineffective" selection shows the paths where the users provide feedback that their question was not answered correctly;

(ix) the "escalated—need rep" selection represents paths that were escalated to the live agent because the chatbot could not answer the question of the user;

(x) the "escalated—negative feedback" selection represents paths that were escalated to the live agent because the user gave negative feedback to the chatbot;

(xi) the "escalated—unknown" selection represents paths that were escalated to the live agent for unknown reasons;

(xii) the "escalated—digitalonboarding" selection represents paths that were escalated to the live agent during digital onboarding; and (xiii) the "escalated—requestedagentimmediately" selection represents paths that were escalated to the live agent immediately by the user.

Figure 5:
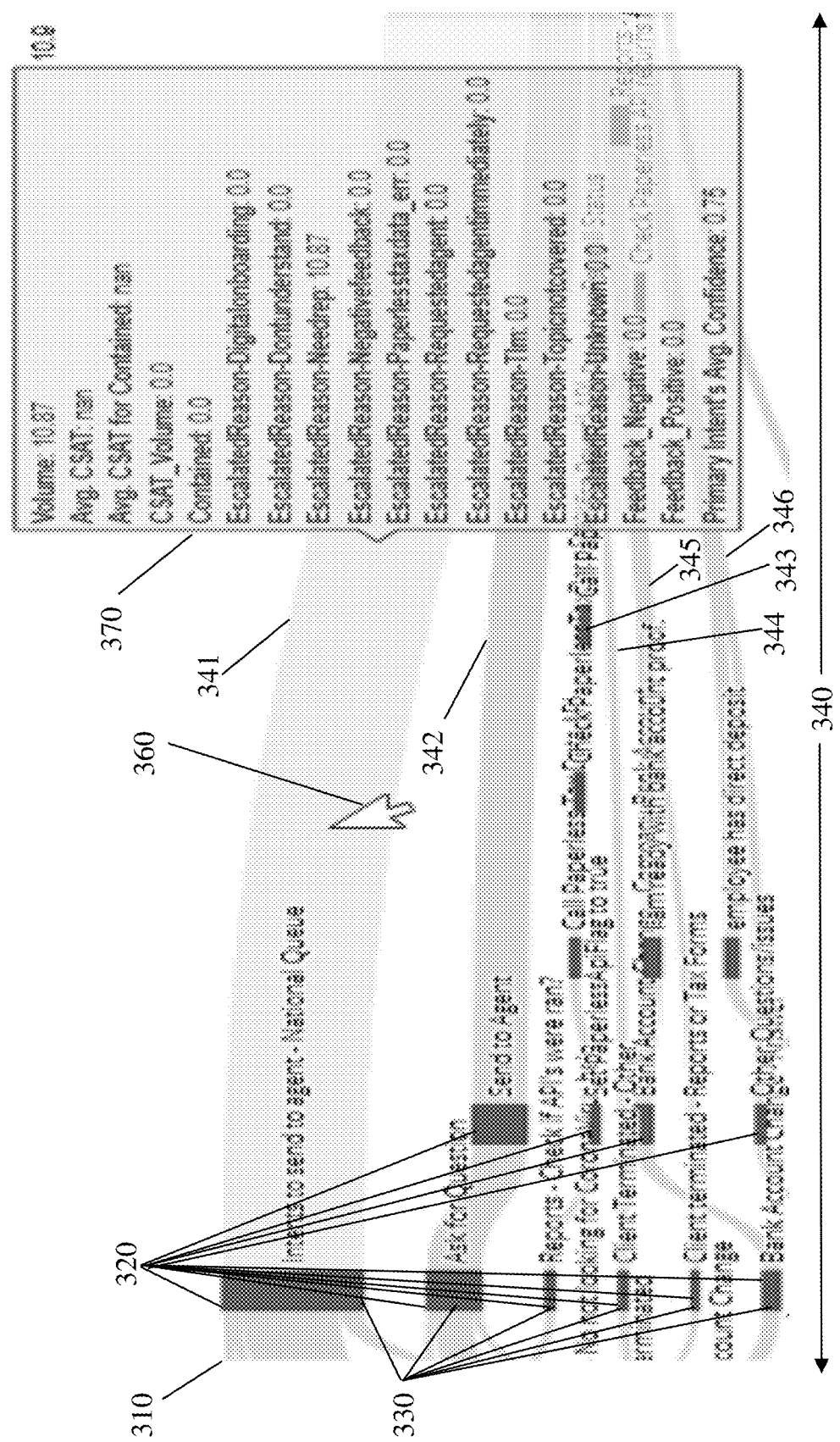
FIGS. 5 depicts data shown on a path in the conversational visualization in accordance with aspects of the present disclosure.

FIG. 5 depicts data a portion of the Sankey Diagram with metrics data 370 for a particular path (i.e., individual path 341) within the conversation. For example, in FIG. 5, when cursor 360 is on the individual path 341, metrics data 370 are shown within an interface of metrics data 370. In embodiments, the metrics data 370 can include volume, customer satisfaction metrics (e.g., CSAT), containment and escalation reasons (e.g., escalatedreason-digitalonboarding, escalatedreason-dontunderstand, escalatedreason-needrep, escalatedreason-negativefeedback, etc.), feedback (e.g., feedback_negative, feedback_positive) and average confidence (e.g., primary intent's avg. confidence), amongst other features. Further, the metrics data 370 may be formatted to emphasize characteristics of the data. For example, the color of the metrics data 370 may be changed to indicate an amount of confidence or volume as non-limiting examples.

Figure 6:
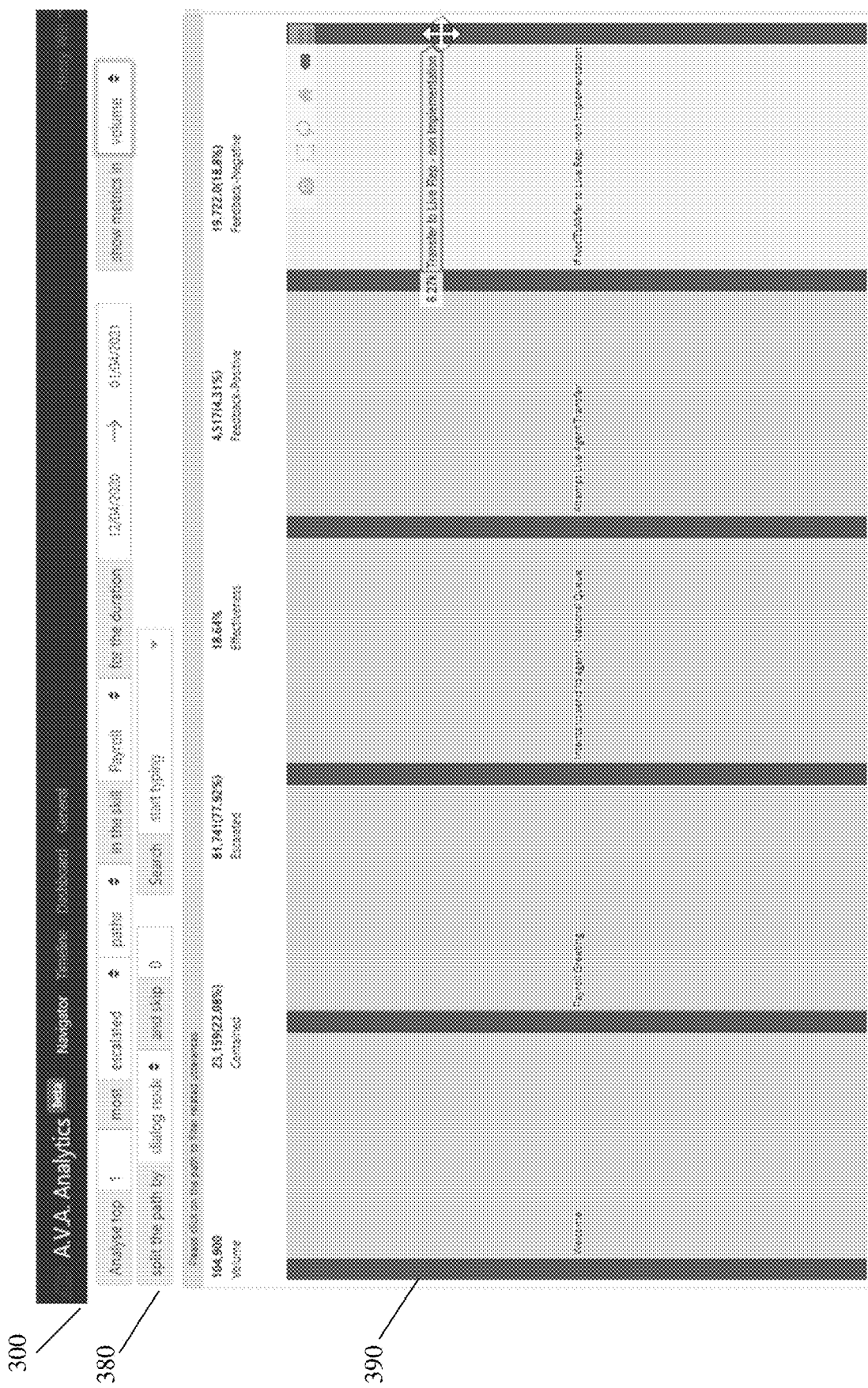
FIG. 6 depicts a most prevalent path in a past month in the conversational visualization in accordance with aspects of the present disclosure.

FIG. 6 depicts a visualization, e.g., graphical user interface, which represents a most prevalent path in a past time period, e.g., month, in the conversational visualization.

More specifically, in FIG. 6, the conversational visualization 300 includes settings 380 and escalated paths 390. In FIG. 6, the settings 380 is a user interface which allows the user to change various aspects to filter data (e.g., a predetermined number of escalation paths, a predetermined frequency range of intents, etc.) for display in the conversational visualization (e.g., graphical user interface). The escalated paths 390 is a graphical representation of the paths which have been escalated by either the user or the chatbot when the flow of the conversation cannot be contained by the chatbot (i.e., the chatbot can no longer handle the flow of the conversation, and then the user/chatbot escalates the flow of the conversation to another representative for handling the flow of the conversation). For example, if the user wants to analyze the most prevalent escalated conversation flows over the past month, the user can change the settings 380 to set the date range accordingly and then set the value to analyze the top escalated paths. Once the user changes the settings 380, the graphical user interface will show the user the most prevalent paths 390 and the volume on the most prevalent paths 390 for the selected period. The user can then select on one of the most prevalent paths 390 and scroll down in the conversational visualization 300 to see topics in these utterances (see FIG. 7).

Figure 7:
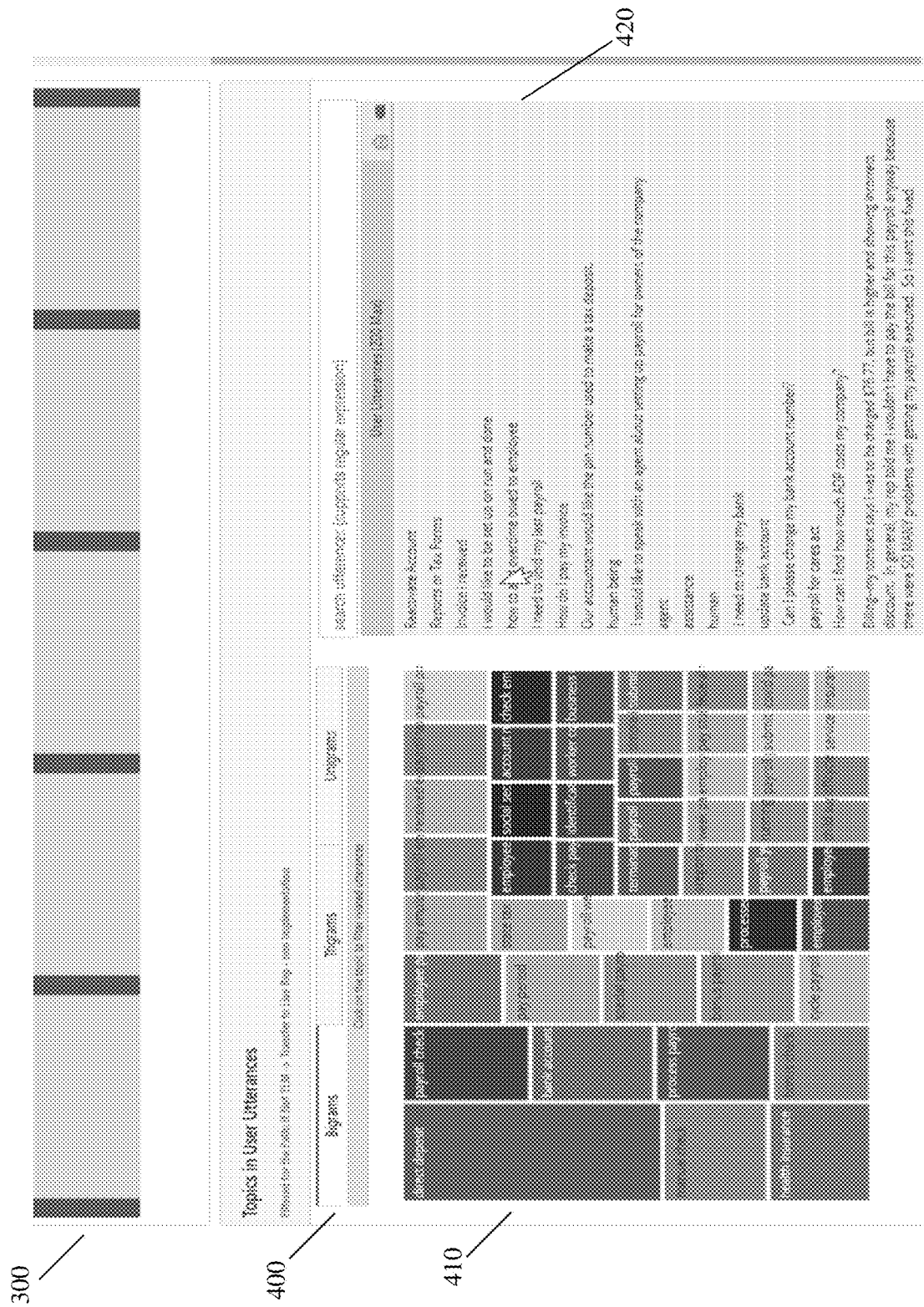
FIG. 7 depicts information for the path in accordance with aspects of the present disclosure.

FIG. 7 depicts a visualization, e.g., conversational visualization 300, which includes an n-gram 400 (e.g., unigram, bigram, and trigram), a visualization 410, and a list of user utterances 420. In FIG. 7, the n-gram 400 is a tab which sets the format of the visualization 410. In FIG. 7, the n-gram 400 is set to a default of the bigram tab. The n-gram 400 can also be set to a unigram tab (i.e., topics for a single word) or a trigram tab (i.e., topics for three consecutive words). Further, the bigram and trigram topics can be listed after pre-processing, stemming, and elimination of unnecessary words (i.e., "and") in the raw data. By performing pre-processing, stemming, and elimination of unnecessary words in the bigram and trigram topics, the bigram and trigram topics provide more relevant topics to the user while removing extraneous data.

By way of example, as shown in FIG. 7, the n-gram 400 is set to a bigram tab, and the visualization 410 shows the most frequent bigram topics (i.e., two consecutive word topics with the highest volume). In the visualization 410 the most frequent bigram topics are provided by size, where the size of the most frequent bigram topics boxes is indicative of the volume of each of the bigram topics. For example, the larger sized boxes represent more frequently used bigrams. Further, the list of user utterances 420 is a list of the most frequent user utterances for the bigram topics in the visualization 410. When the user clicks on "direct deposit", then FIG. 8 will be shown.

Figure 8:
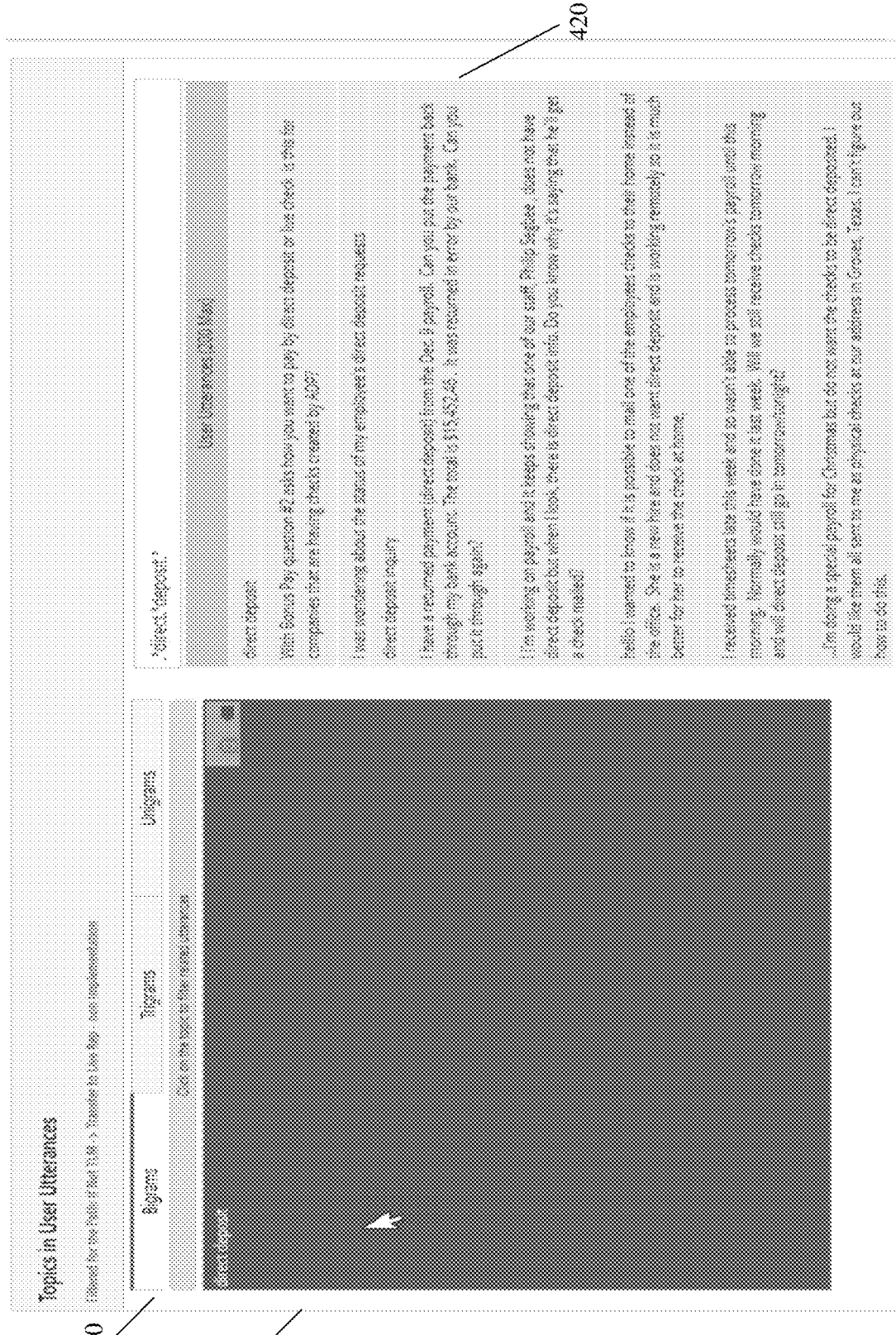
FIG. 8 depicts specific utterance bigrams in accordance with aspects of the present disclosure.

FIG. 8 depicts an example of a visualization, e.g., graphical user interface of a rectangular tree map, which represents specific utterance bigrams. In FIG. 8, the user can select a specific bigram topic (e.g., direct deposit) of the tree visualization 410 to see the user utterances 420 corresponding to the one of the most prevalent paths 390 in FIG. 6 that included the specific bigram topic (e.g., direct deposit).

Figure 9:
FIG. 9 depicts selecting top intents in accordance with aspects of the present disclosure.

FIG. 9 depicts an example visualization, e.g., graphical user interface, which represents selecting top intents in accordance with aspects of the present disclosure. In FIG. 9, the user can change the settings 380 to set the value to analyze the intents to show what the top intents 430 are. Further, if a user selects one of the top intents 430, the user utterances 420 can be filtered based on which top intents 430 have been selected.

The user can also switch to "intents" analysis by changing the settings 380 to analyze volume based on intents of the conversation. In particular, instead of viewing the flow of the conversation through nodes 320, the user can change a view of the Sankey Diagram 310 to analyze the volume 330 based on top intents 430 and utterances 420 corresponding to the more important intents 430 (see FIG. 9). The user can also visualize the frequency of utterances related to unigrams (i.e., single word), bigrams (i.e., two consecutive words), and trigrams (i.e., three consecutive words) in the Sankey Diagram 310. In particular, instead of viewing the flow of the conversation through nodes on the path of the Sankey Diagram 310, the user can change the view of the Sankey Diagram 310 to analyze the volume of the user utterances related to the n-gram 400 (see FIG. 9).

Figure 10:
FIG. 10 depicts selecting reports and trigrams in accordance with aspects of the present disclosure.

FIG. 10 depicts an example visualization, e.g., graphical user interface, which represents selecting reports and trigrams. In FIG. 10, the n-gram 400 is set to the trigram tab; although other n-grams are contemplated herein In FIG. 10, once the user reviews the utterances 420 that lead to top intents 430 leading to escalation, the user can select one of the intents 430 at which time the systems, methods and computer program products provide corresponding user utterances 420 and related n-gram 400 for the user. In this example, the user selected intents 430 (e.g., "report-get") and the trigram tab. The visualization will now be generated to show the user several utterances 420 that lead to the "report-get" intent 430 and ended in escalation to a live agent. The user can review the training for this intent 430 for updating of the training, if needed. Further, the user may also need to review the chatbot response for the intent 430.

Figure 11:
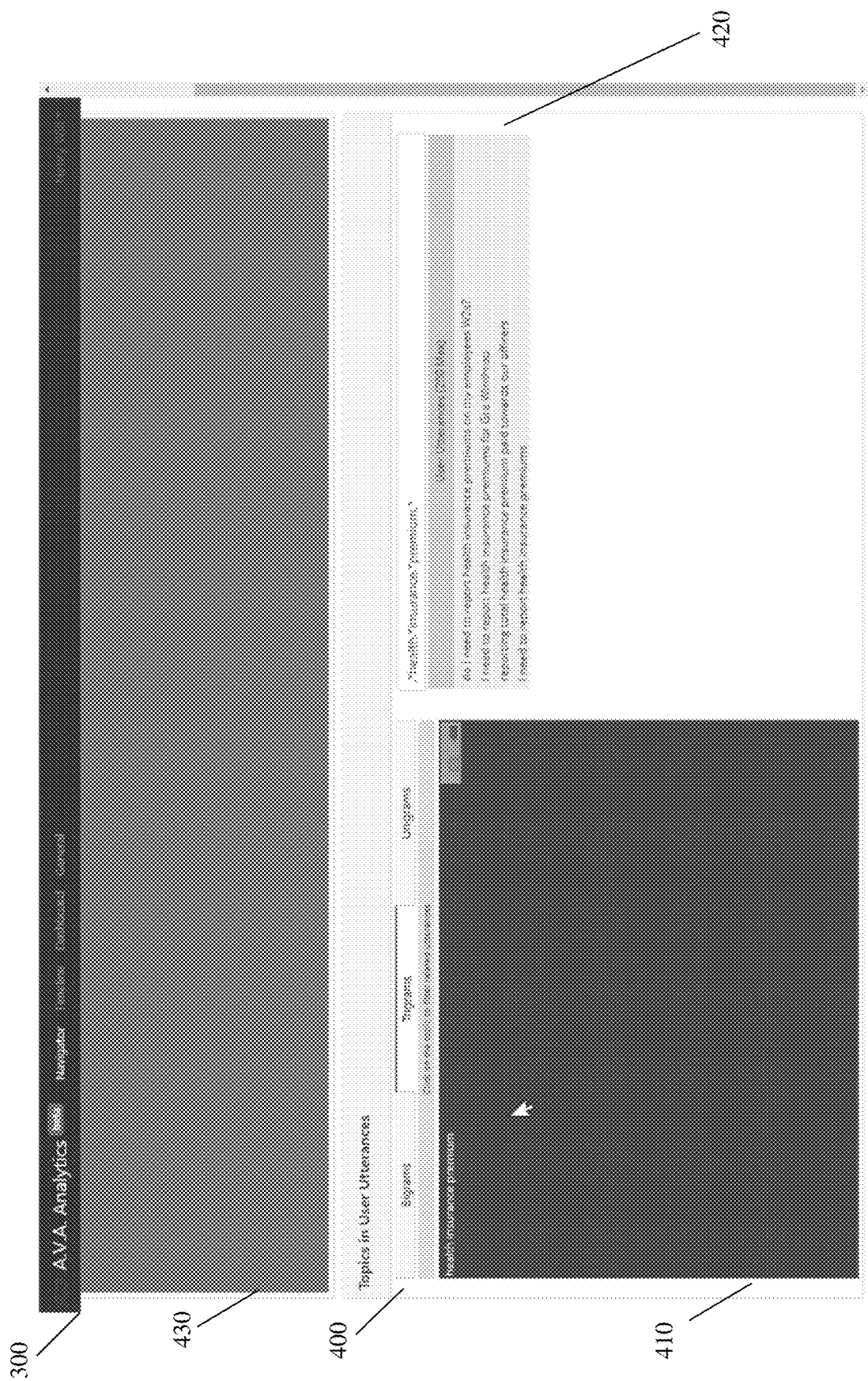
FIG. 11 depicts selecting specific trigrams in accordance with aspects of the present disclosure.

FIG. 11 depicts an example visualization, e.g., graphical user interface, which represents selecting specific trigrams as one non-limiting illustrative example. For example, in FIG. 11, the user selects "health insurance premium" for the visualization 410 to see the user utterances 420 associated with the n-gram 400 (i.e., trigram). Further, the user utterances 420 can be filtered based on the selection of "health insurance premium". In further embodiments, the paths of the conversational visualization 300 can have a colorization (e.g., heatmap colorization) according to user selections from one of the following metrics: CSAT, percent per escalation reasons, intent confidence, feedback (positive or negative), or relative effectiveness.

Figure 12:
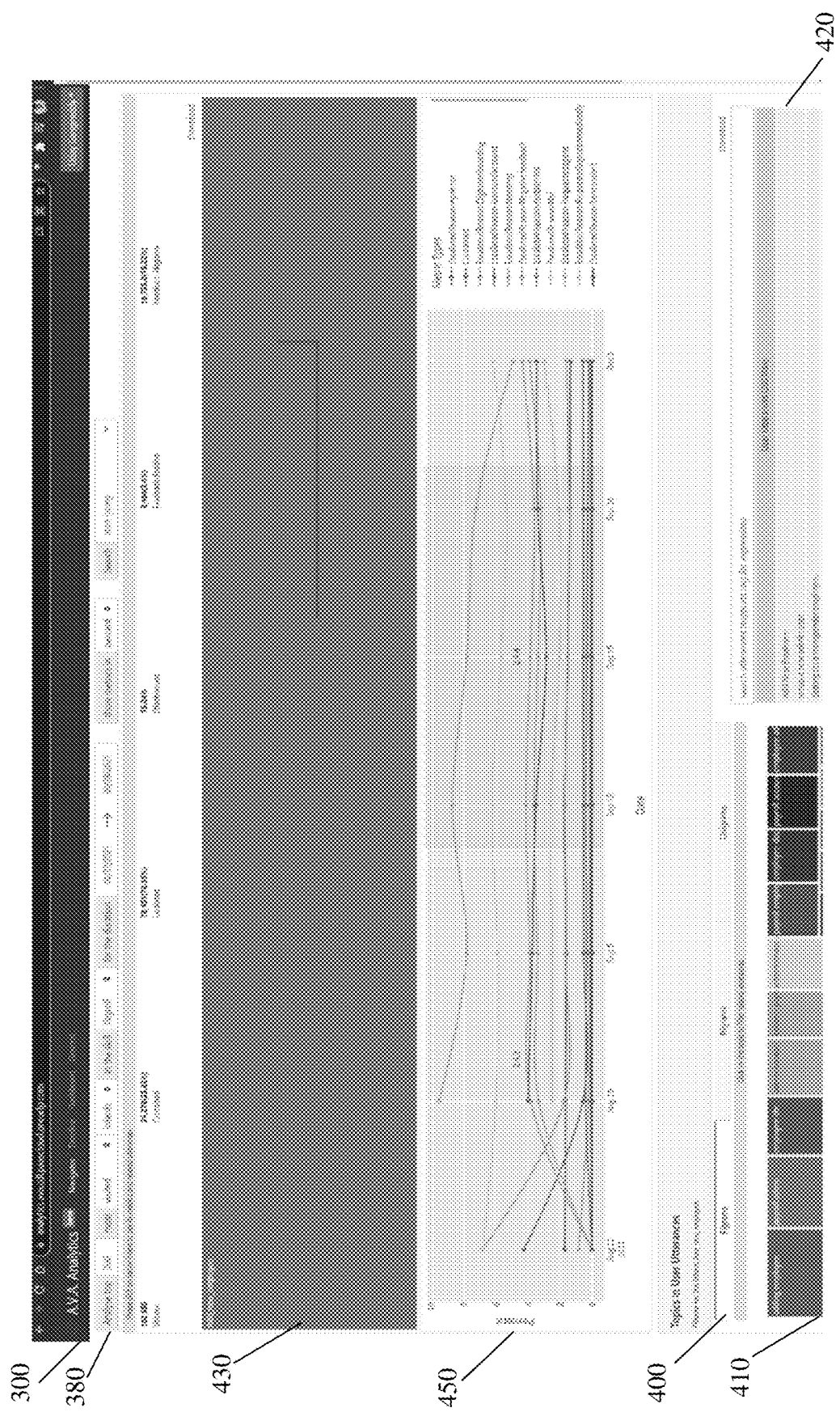
FIG. 12 depicts intent level metrics in accordance with aspects of the present disclosure.

FIG. 12 depicts an example visualization, e.g., graphical user interface, which represents intent level metrics as one non-limiting illustrative example. For example, in FIG. 12, the user selects "intents" and "percent" by changing the settings 380 in order to analyze intent level metric types in percentages. Also, in FIG. 12, an intent level metrics graph 450 shows a plurality of intent level metric types at a corresponding percent over a duration of time. In further embodiments, intent level metrics may be displayed upon the user clicking on one of the intent level metric types in the intent level metrics graph 450. In other embodiments, the user may select "intents" and "volume" by changing the settings 380.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects.

Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method, comprising:
    receiving, by a computer system including one or more processors coupled with memory, a plurality of conversational transcripts, wherein the plurality of conversational transcripts include inputs provided to a chatbot and outputs generated by the chatbot;
    converting, by the computer system, the plurality of conversational transcripts into a first visualization which includes a plurality of branches comprising a first path representing a first conversation with the chatbot and a second path representing a second conversation with the chatbot that is different than the first path;
    determining, by the computer system, a first performance of the chatbot during the first path and a second performance of the chatbot during the second path based on a first count of prompts to the chatbot or a second count of outputs from the chatbot during the first path and the second path;
    updating, by the computer system, the first visualization to include:
        a first graphical element having a first visual attribute to indicate the first performance of the chatbot during the first path; and
        a second graphical element having a second visual attribute to indicate the second performance of the chatbot during the second path;
    displaying, by the computer system, the first visualization including the first graphical element and the second graphical element;
    providing, by the computer system, a user interface that includes a menu configured to display a plurality of paths traversed by the chatbot during different conversations with the chatbot, one or more paths of the plurality of paths corresponding to respective path types of a plurality of path types;
    receiving, by the computer system, a selection of a first path type of the plurality of path types; and
    displaying, by the computer system, responsive to the selection, a second visualization that includes one or more graphical elements to indicate a third performance of the chatbot during the one or more paths that correspond to the first path type.

2. The method of claim 1, wherein respective branches of the plurality of branches represent the different conversations with the chatbot, and wherein the plurality of branches include a node within the first path and the second path.

3. The method of claim 1, further comprising a plurality of nodes within the plurality of branches, and the plurality of branches represent metrics of the different conversations with the chatbot.

4. The method of claim 3, wherein a first branch of the plurality of branches diverges from a second branch of the plurality of branches, wherein divergence of the first branch represents that both the first branch and the second branch represent different paths.

5. The method of claim 3, wherein a first branch of the plurality of branches converges into a second branch of the plurality of branches, wherein convergence of the first branch represents that both the first branch and the second branch led to a given conversation.

6. The method of claim 1, wherein the first visualization comprises a Sankey Diagram which shows a proportional volume of conversations going through the plurality of branches, and the Sankey Diagram is configured to filter the plurality of conversational transcripts to provide insights for the plurality of conversational transcripts.

7. The method of claim 6, wherein a width of a plurality of nodes or a width of the plurality of branches is indicative of a volume of a portion of the plurality of conversational transcripts.

8. The method of claim 1, further comprising:
    changing, by the computer system, at least one parameter of the first visualization, and the first visualization comprises a tree map diagram which is filtered to provide insights for the plurality of conversational transcripts.

9. The method of claim 8, wherein changing the at least one parameter of the first visualization includes at least one of:
    filtering, by the computer system, a predetermined number of escalation paths of the plurality of conversational transcripts;
    filtering, by the computer system, a predetermined frequency range of intents related to an escalation to a live agent;
    filtering, by the computer system, another predetermined frequency range of intents according to a reason for the escalation to the live agent; or
    filtering, by the computer system, contained paths that were not escalated to the live agent.

10. The method of claim 1, further comprising:
    displaying, by the computer system, metrics data related to at least one branch of the plurality of branches representing different conversation paths.

11. The method of claim 1, further comprising:
    generating, by the computer system, n-grams of different sizes, wherein the different sizes are representative of a volume of the n-grams, words, or phrases used within the plurality of conversational transcripts.

12. The method of claim 1, wherein the one or more paths that correspond to the first path type include at least one of (i) a path completed by the chatbot or (ii) a path transferred from the chatbot and wherein the third performance of the chatbot includes first metrics associated with the path completed by the chatbot or second metrics associated with the path transferred from the chatbot.

13. The method of claim 1, wherein the third performance of the chatbot includes one or more metrics that represent feedback received from one or more computing devices linked to the one or more paths that correspond to the first path type, and further comprising:
    detecting, by the computer system, an interaction with a first path of the one or more paths of that correspond to the first path type; and
    displaying, by the computer system, responsive to detecting the interaction, a third visualization of a first metric of the one or more metrics, the first metric corresponding to the first path.

14. A computer program product comprising one or more non-transitory computer readable storage media having program instructions collectively stored on the one or more non-transitory computer readable storage media, the program instructions executable to cause one or more processors to perform operations comprising:

receiving a plurality of conversational transcripts which include inputs provided to a chatbot and outputs generated by the chatbot;

converting the plurality of conversational transcripts into a first visualization which includes a plurality of branches comprising a first path representing a first conversation with the chatbot and a second path representing a second conversation with the chatbot that is different than the first path;

determining a first performance of the chatbot during the first path and a second performance of the chatbot during the second path based on a first count of prompts to the chatbot or a second count of outputs from the chatbot during the first path and the second path;

updating the first visualization to include:
  a first graphical element having a first visual attribute to indicate the first performance of the chatbot during the first path; and
  a second graphical element having a second visual attribute to indicate the second performance of the chatbot during the second path;

displaying the first visualization including the first graphical element and the second graphical element;

providing a user interface that includes a menu configured to display a plurality of paths traversed by the chatbot during different conversations with the chatbot, one or more paths of the plurality of paths corresponding to respective path types of a plurality of path types;

receiving a selection of a first path type of the plurality of path types; and displaying, responsive to the selection, a second visualization that includes one or more graphical elements to indicate a third performance of the chatbot during the one or more paths that correspond to the first path type.

15. The computer program product of claim 14, wherein the first visualization includes metrics data including a percent of total volume per escalation path, a volume corresponding to the escalation path, a plurality of intents related to a reason for escalation to a live agent, volume of conversations which were contained within the chatbot and not escalated to a live agent, customer satisfaction metrics, containment reasons, user feedback, escalation reasons, and average confidence.

16. The computer program product of claim 14, further comprising nodes within the plurality of branches which are representative of metrics data.

17. The computer program product of claim 14, the first visualization further comprising n-grams of different sizes according to a volume, and the different sizes being representative of the volume of the n-grams, words, or phrases within the plurality of conversational transcripts.

18. The computer program product of claim 15, the operations further comprising:

searching a Sankey Diagram to filter one of the metrics data in the plurality of conversational transcripts to provide insights for the plurality of conversational transcripts.

19. The computer program product of claim 17, the first visualization including boxes which are sized to be representative of a metric volume.

20. The computer program product of claim 14, wherein the first visualization includes a Sankey Diagram that comprises a colorization to indicate metrics data.

21. A system, comprising:
a processor, a computer readable memory, one or more computer readable storage media, and program instructions collectively stored on the one or more computer readable storage media, the program instructions executable to:

receive a plurality of conversational transcripts which include inputs provided to a chatbot and outputs generated by the chatbot;

convert the plurality of conversational transcripts into a first visualization which includes a plurality of branches comprising a first path representing a first conversation with the chatbot and a second path representing a second conversation with the chatbot that is different than the first path;

determine a first performance of the chatbot during each of the first path and a second performance of the chatbot during the second path based on a first count of prompts to the chatbot or a second count of outputs from the chatbot during the first path and the second path;

update the first visualization to include:
  a first graphical element having a first visual attribute to indicate the first performance of the chatbot during the first path; and
  a second graphical element having a second visual attribute to indicate the second performance of the chatbot during the second path;

display the first visualization including the first graphical element and the second graphical element;

provide a user interface that includes a menu configured to display a plurality of paths traversed by the chatbot during different conversations with the chatbot, one or more paths of the plurality of paths corresponding to respective path types of a plurality of path types;

receive a selection of a first path type of the plurality of path types; and display, responsive to the selection, a second visualization that includes one or more graphical elements to indicate a third performance of the chatbot during the one or more paths that correspond to the first path type.

* * * * *